(12) United States Patent
Lee et al.

(10) Patent No.: US 10,815,391 B2
(45) Date of Patent: Oct. 27, 2020

(54) APPARATUS COMPRISING AN ENCAPSULATED MEMBER

(71) Applicant: CHEIL INDUSTRIES, INC., Gumi-si, Gyeongsangbuk-do (KR)

(72) Inventors: Chang Min Lee, Uiwang-si (KR); Seung Jib Choi, Uiwang-si (KR); Ji Hye Kwon, Uiwang-si (KR); Irina Nam, Uiwang-si (KR); Jin Seong Park, Uiwang-si (KR); Yeon Soo Lee, Uiwang-si (KR); Kyoung Jin Ha, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 107 days.

(21) Appl. No.: 15/690,855

(22) Filed: Aug. 30, 2017

(65) Prior Publication Data

US 2017/0362462 A1 Dec. 21, 2017

Related U.S. Application Data

(62) Division of application No. 13/785,354, filed on Mar. 5, 2013, now abandoned.

(30) Foreign Application Priority Data

Mar. 6, 2012 (KR) .................. 10-2012-0022909
Jan. 14, 2013 (KR) .................. 10-2013-0004177

(51) Int. Cl.
*C09D 183/06* (2006.01)
*C08L 83/06* (2006.01)
(Continued)

(52) U.S. Cl.
CPC ............ *C09D 183/06* (2013.01); *C08L 83/06* (2013.01); *C09D 143/04* (2013.01); *C08G 77/20* (2013.01); *C08L 2312/06* (2013.01); *Y10T 428/23* (2015.01)

(58) Field of Classification Search
CPC .................................................. Y10T 428/23
See application file for complete search history.

(56) References Cited

U.S. PATENT DOCUMENTS 5,081,164 A 1/1992 Lai
5,091,483 A * 2/1992 Mazurek .................. C07F 7/12
525/477

(Continued)

FOREIGN PATENT DOCUMENTS

CN 102165017 A 8/2011
JP 2008-189747 A 8/2008
WO WO-2011093286 A1 * 8/2011 ........... C23C 14/024

OTHER PUBLICATIONS

Masson et al. (Progress in Organic Coatings 49 (2004) 1-12) (Year: 2004).*

(Continued)

*Primary Examiner* — Liam J Heincer
(74) *Attorney, Agent, or Firm* — Lee IP Law, P.C.

(57) ABSTRACT

A photocurable composition includes (A) a photocurable monomer and (B) a silicon-containing monomer or oligomer thereof, the silicon-containing monomer being represented by Formula 1

(Continued)

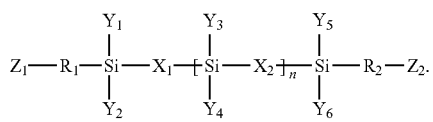

[Formula 1]

16 Claims, 1 Drawing Sheet

(51) Int. Cl.
C09D 143/04 (2006.01)
C08G 77/20 (2006.01)

(56) References Cited

U.S. PATENT DOCUMENTS

| | | | |
|---|---|---|---|
| 5,290,820 A | 3/1994 | Brownscombe et al. | |
| 5,607,789 A * | 3/1997 | Treger | H01M 2/0267 324/426 |
| 5,895,228 A * | 4/1999 | Biebuyck | H01L 51/524 438/127 |
| 6,136,874 A | 10/2000 | Dyer et al. | |
| 6,499,354 B1 * | 12/2002 | Najafi | B81C 1/00285 73/723 |
| 6,555,234 B1 * | 4/2003 | Piao | G03F 7/11 428/336 |
| 6,632,535 B1 * | 10/2003 | Buazza | B29D 11/00442 427/164 |
| 9,534,069 B2 * | 1/2017 | Woo | C08G 77/20 |
| 9,562,123 B2 * | 2/2017 | Lee | C08L 83/08 |
| 2001/0038894 A1 * | 11/2001 | Komada | B32B 7/02 428/34.6 |
| 2002/0004577 A1 | 1/2002 | Biebuyck et al. | |
| 2003/0235787 A1 | 12/2003 | Watts et al. | |
| 2004/0012914 A1 * | 1/2004 | Chu | H01L 23/3121 361/679.47 |
| 2004/0025479 A1 * | 2/2004 | Soyama | A61L 9/16 55/354 |
| 2004/0031977 A1 * | 2/2004 | Brown | H01L 51/5246 257/222 |
| 2004/0112862 A1 | 6/2004 | Willson et al. | |
| 2007/0141837 A1 * | 6/2007 | Ryu | H01L 21/76814 438/672 |
| 2009/0305064 A1 * | 12/2009 | Tsukahara | C08J 7/045 428/447 |
| 2009/0324942 A1 * | 12/2009 | Tsukahara | C08J 7/045 428/339 |
| 2010/0003480 A1 * | 1/2010 | Agata | G02F 1/1333 428/213 |
| 2011/0171447 A1 * | 7/2011 | Krishnamoorthy | C09D 183/04 428/220 |
| 2011/0236660 A1 * | 9/2011 | Murakami | B32B 7/02 428/213 |
| 2011/0315972 A1 * | 12/2011 | Takahashi | H01L 51/0097 257/40 |
| 2012/0301634 A1 * | 11/2012 | Nakamura | C23C 14/024 428/1.1 |
| 2013/0193844 A1 * | 8/2013 | Morita | H01L 25/048 313/504 |
| 2013/0236681 A1 * | 9/2013 | Lee | C09D 183/06 428/68 |
| 2014/0027739 A1 * | 1/2014 | van de Weijer | H01L 51/5256 257/40 |
| 2014/0049825 A1 * | 2/2014 | van Mol | H01L 51/5253 359/513 |
| 2014/0106111 A1 * | 4/2014 | Nam | G03F 7/0755 428/76 |
| 2014/0106151 A1 * | 4/2014 | Mori | H01L 51/5253 428/216 |
| 2014/0154471 A1 | 6/2014 | Kodama et al. | |
| 2015/0252125 A1 * | 9/2015 | Moro | C09D 143/04 428/447 |
| 2015/0318482 A1 * | 11/2015 | Kwon | H01L 51/5253 257/40 |
| 2015/0344697 A1 * | 12/2015 | Nam | H01L 23/293 257/790 |
| 2015/0353668 A1 * | 12/2015 | Woo | C08G 77/20 257/790 |
| 2015/0364690 A1 * | 12/2015 | Nam | H01L 51/5256 257/40 |
| 2016/0017170 A1 * | 1/2016 | Lee | C08F 230/02 257/40 |
| 2016/0072098 A1 * | 3/2016 | Lee | C09K 11/06 257/40 |
| 2017/0149016 A1 * | 5/2017 | Nam | H01L 51/5256 |

OTHER PUBLICATIONS

Modified Silicon Fluids X-22-164 Series (Action dated Feb. 6, 2017—in parent U.S. Appl. No. 13/785,354).

Office Action dated Sep. 11, 2014 in corresponding Chinese Patent Application No. 102013100717147.

* cited by examiner

APPARATUS COMPRISING AN ENCAPSULATED MEMBER

CROSS-REFERENCE TO RELATED APPLICATIONS

This is a divisional application based on pending application Ser. No. 13/785,354, filed Mar. 5, 2013, the entire contents of which is hereby incorporated by reference.

Korean Patent Application No. 10-2012-0022909, filed on Mar. 6, 2012, and Korean Patent Application No. 10-2013-0004177, filed on Jan. 14, 2013, in the Korean Intellectual Property Office, and entitled: "Photocurable Composition, Barrier Layer including the Same, and Encapsulated Apparatus including the Same" are each incorporated by reference herein in their entirety.

BACKGROUND

1. Field

Embodiments relate to a photocurable composition, a barrier layer including the same and an encapsulated apparatus including the same.

2. Description of the Related Art

Organic light emitting diodes (OLED) refer to a structure in which a functional organic material layer is inserted between an anode and a cathode, wherein an exciton having high energy can be created by recombination of a hole injected into the cathode and an electron injected into the anode. The created exciton may move to a ground state, thereby emitting light within a specific wavelength band. The organic light emitting diodes have various merits such as self-luminance, fast response, wide viewing angle, ultra-thinness, high definition, and durability.

SUMMARY

Embodiments are directed to a photocurable composition, including a photocurable monomer, and a silicon-containing monomer or oligomer thereof, the silicon-containing monomer being represented by Formula 1:

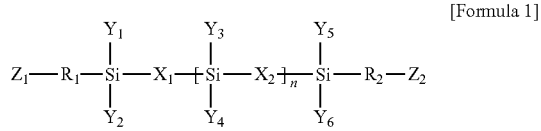

[Formula 1]

In Formula 1, $X_1$ and $X_2$ may be the same or different and may be O, S, N—H, or N—R'; R' may be a substituted or unsubstituted C1-C20 alkyl group; $R_1$ and $R_2$ may be the same or different and may be a single bond, a substituted or unsubstituted C1-C20 alkylene group, a substituted or unsubstituted C1-C30 alkyl ether group, a substituted or unsubstituted C1-C30 alkylamine group, a substituted or unsubstituted C1-C30 alkyl sulfide group, a substituted or unsubstituted C6-C30 arylene group, a substituted or unsubstituted C7-C30 arylalkylene group, or a substituted or unsubstituted C1-C20 alkoxylene group; $Y_1, Y_2, Y_3, Y_4, Y_5,$ and $Y_6$ may be the same or different and may be hydrogen, a substituted or unsubstituted C1-C30 alkyl group, a substituted or unsubstituted C1-C30 alkyl ether group, a substituted or unsubstituted C1-C30 dialkylamine group, a substituted or unsubstituted C1-C30 alkyl sulfide group, a substituted or unsubstituted C6-C30 aryl group, a substituted or unsubstituted C7-C30 aryl alkyl group, a substituted or unsubstituted C1-C30 alkylene group, a substituted or unsubstituted C1-C30 alkoxylene group, or a compound represented by Formula 2 or 3:

wherein * represents a binding site for Si in Formula 1; $R_3, R_4, R_5, R_6, R_7,$ and $R_8$ may be the same or different and may be hydrogen, a substituted or unsubstituted C1-C30 alkyl group, a substituted or unsubstituted C1-C30 alkyl ether group, a substituted or unsubstituted C1-C30 dialkylamine group, a substituted or unsubstituted C1-C30 alkyl sulfide group, a substituted or unsubstituted C6-C30 aryl group, or a substituted or unsubstituted C7-C30 aryl alkyl group; $X_3$ may be O, S, N—H, or N—R'; R' may be a substituted or unsubstituted C1-C20 alkyl group; $Z_1$ and $Z_2$ may be the same or different and are a compound represented by Formula 4:

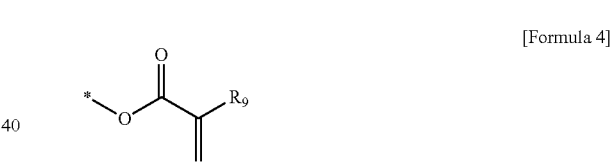

[Formula 4]

wherein * represents a binding site for $R_1$ or $R_2$ in Formula 1, $R_9$ may be hydrogen, or a substituted or unsubstituted C1-C30 alkyl group; and n may be an integer, n being from 0 to about 30 or an average value of n being about 30 or less.

The silicon-containing monomer may include one or more of 1,3-bis(3-(meth)acryloxypropyl)tetramethyldisiloxane, 1,3-bis(3-(meth)acryloxypropyl)tetrakis(trimethylsiloxy) disiloxane, or a monomer represented by Formula 5:

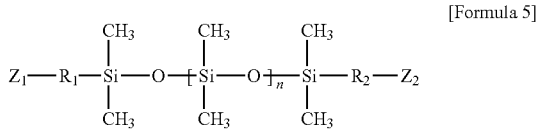

[Formula 5]

wherein $Z_1, Z_2, R_1, R_2$ and n are as defined in Formula 1.

The photocurable monomer may include a monomer having about 1 to about 30 of a substituted or unsubstituted vinyl group, about 1 to about 30 of a substituted or unsubstituted acrylate group, or about 1 to about 30 of a substituted or unsubstituted methacrylate group.

The photocurable monomer may include one or more of a mono(meth)acrylate having a C1-C20 alkyl group, a di(meth)acrylate of a C2-C20 diol, a tri(meth)acrylate of a C3-C20 triol, or a tetra(meth)acrylate of a C4-C20 tetraol.

The photocurable composition may include about 1 to about 99 parts by weight of the photocurable monomer and about 1 to about 99 parts by weight of the silicon-containing monomer or oligomer thereof based on 100 parts by weight of the photocurable monomer and the silicon-containing monomer or oligomer thereof in terms of solid content.

The photocurable composition may further include a photopolymerization initiator.

The photocurable composition may include about 1 to about 99 parts by weight of the photocurable monomer and about 1 to about 99 parts by weight of the silicon-containing monomer or oligomer thereof based on 100 parts by weight of the photocurable monomer and the silicon-containing monomer or oligomer thereof in terms of solid content, and about 0.1 to about 20 parts by weight of the photopolymerization initiator based on 100 parts by weight of the photocurable monomer and the silicon-containing monomer or oligomer thereof in terms of solid content.

Embodiments are also directed to a member for an apparatus, the member being encapsulated with the photocurable composition according to an embodiment.

Embodiments are also directed to an apparatus including an encapsulated member, the encapsulated member including a barrier stack on the member, the barrier stack including an inorganic barrier layer and an organic barrier layer, the organic barrier layer having an outgas generation amount of about 2000 ppm or less.

The inorganic barrier layer may include one or more of a metal, a metal oxide, a metal nitride, a metal carbide, a metal oxygen nitride, a metal oxygen boride, and the metal may be silicon, aluminum, selenium, zinc, antimony, indium, germanium, tin, bismuth, a transition metal, or a lanthanide metal.

The organic barrier layer and the inorganic barrier layer may be alternately deposited in the barrier stack.

The organic barrier layer and the inorganic barrier layer may be deposited a total of 10 times or less in the barrier stack.

The organic barrier layer may have a thickness of about 0.1 µm to about 20 µm and the inorganic barrier layer may have a thickness of about 5 nm to about 500 nm.

The member may include one or more of a flexible organic light emitting diode, an organic light emitting diode, an illumination device, a metal sensor pad, a microdisc laser, an electrochromic apparatus, a photochromic device, a microelectromechanical system, a solar cell, an integrated circuit, a charge coupled device, a light emitting polymer, or a light emitting diode.

Embodiments are also directed to an apparatus including an encapsulated member, the encapsulated member including a barrier stack on the member, the barrier stack including an inorganic barrier layer and an organic barrier layer, the organic barrier layer having a water vapor transmission rate of about 4.0 g/m$^2$·24 hr or less as measured at 37.8° C. and 100% RH for 24 hours at a layer thickness of 5 µm in a thickness direction.

The inorganic barrier layer may include one or more of a metal, a metal oxide, a metal nitride, a metal carbide, a metal oxygen nitride, a metal oxygen boride, and the metal may be silicon, aluminum, selenium, zinc, antimony, indium, germanium, tin, bismuth, a transition metal, or a lanthanide metal.

The organic barrier layer and the inorganic barrier layer may be alternately deposited in the barrier stack.

The organic barrier layer and the inorganic barrier layer may be deposited a total of 10 times or less in the barrier stack.

The organic barrier layer may have a thickness of about 0.1 µm to about 20 µm and the inorganic barrier layer may have a thickness of about 5 nm to about 500 nm.

The member may include one or more of a flexible organic light emitting diode, an organic light emitting diode, an illumination device, a metal sensor pad, a microdisc laser, an electrochromic apparatus, a photochromic device, a microelectromechanical system, a solar cell, an integrated circuit, a charge coupled device, a light emitting polymer, or a light emitting diode.

BRIEF DESCRIPTION OF DRAWINGS

Features will become apparent to those of skill in the art by describing in detail exemplary embodiments with reference to the attached drawings in which.

DETAILED DESCRIPTION

Figure 1:
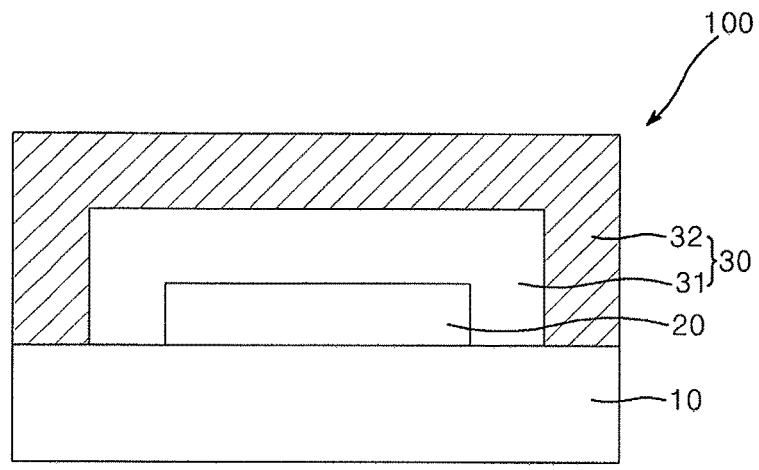
FIG. 1 is a sectional view of an encapsulated apparatus according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "on" another element, it can be directly on the other element, or one or more intervening elements may also be present. It will also be understood that when an element is referred to as being "under" another element, it can be directly under, or one or more intervening elements may also be present. It will also be understood that when an element is referred to as being "between" two elements, it can be the only element between the two elements, or one or more intervening elements may also be present. Like reference numerals refer to like elements throughout.

Unless otherwise stated, the term "substituted" as used herein means that at least one hydrogen atom among functional groups is substituted with a halogen (F, Cl, Br or I), a hydroxyl group, a nitro group, a cyano group, an imino group (=NH, =NR, wherein R is a C1-C10 alkyl group), an amino group [—NH$_2$, —NH(R'), or —N(R")(R'"), wherein R', R", and R'" are each independently a C1-C10 alkyl group], an amidino group, a hydrazine or a hydrazone group, carboxylic acid group, a substituted or unsubstituted C1-C20 alkyl group, a substituted or unsubstituted C6-C30 aryl group, a substituted or unsubstituted C3-C30 cycloalkyl group, a substituted or unsubstituted C3-C30 heteroaryl group, or a substituted or unsubstituted C2-C30 heterocycloalkyl group.

The term "hetero" as used herein means that a carbon atom is replaced with an atom selected from the group of N, O, S, and P.

The symbol "*" as used herein is a linkage site of elements.

An embodiment relates to a photocurable composition including (A) a photocurable monomer, and (B) a silicon-containing monomer or oligomer thereof.

(A) Photocurable Monomer

In an embodiment, the photocurable monomer refers to a non-silicon type photocurable monomer which does not contain silicon. The photocurable monomer may have one or more photocurable functional groups, for example, a (meth) acrylate group, a vinyl group, or the like.

The photocurable monomer may include one or more of a monofunctional monomer or a polyfunctional monomer, which may have one or more photocurable functional groups such as an unsaturated group. The photocurable monomer may include monomers having about 1 to about 30 photocurable functional groups, e.g., about 1 to about 20 or about 1 to about 5 photocurable functional groups. The photocurable functional groups may include one or more of a substituted or unsubstituted vinyl group, an acrylate group, or a methacrylate group.

The photocurable monomer may include a mixture of a monofunctional monomer and a polyfunctional monomer. In the mixture, the monofunctional monomer: polyfunctional monomer may be present in a weight ratio from about 1:0.1 to about 1:10, e.g., about 1:0.5 to about 1:3.5.

Examples of the photocurable monomer may include a C6-C20 aromatic compound having a substituted or unsubstituted vinyl group; an unsaturated carboxylic acid ester having one or more of a C1-C20 alkyl group, a C3-C20 cycloalkyl group, a C6-C20 aromatic group, or a hydroxyl group and a C1-C20 alkyl group; an unsaturated carboxylic acid ester having a C1-C20 amino alkyl group; a vinyl ester of a C1-C20 saturated or unsaturated carboxylic acid; a C1-C20 unsaturated carboxylic acid glycidyl ester; a vinyl cyanide compound; an unsaturated amide compound; a monofunctional or polyfunctional (meth)acrylate of a mono-alcohol or a polyhydric alcohol, and the like. The 'polyhydric alcohol' refers to an alcohol having two or more hydroxyl groups, e.g., about 2 to about 20, or about 2 to about 10, or about 2 to about 6 hydroxyl groups.

In some embodiments, examples of the photocurable monomer may include a C6-C20 aromatic compound having an alkenyl group including a vinyl group such as styrene, α-methyl styrene, vinyl toluene, vinyl benzyl ether, vinyl benzyl methyl ether, and the like; an unsaturated carboxylic acid ester such as methyl (meth)acrylate, ethyl (meth)acrylate, butyl (meth)acrylate, 2-hydroxyethyl (meth)acrylate, 2-hydroxybutyl (meth)acrylate, hexyl (meth)acrylate, octyl (meth)acrylate, nonyl (meth)acrylate, decanyl (meth)acrylate, undecanyl (meth)acrylate, dodecyl (meth)acrylate, cyclohexyl (meth)acrylate, benzyl (meth)acrylate, phenyl (meth)acrylate, and the like; an unsaturated carboxylic acid amino alkyl ester such as 2-aminoethyl (meth)acrylate, 2-dimethylaminoethyl (meth)acrylate, and the like; a saturated or unsaturated carboxylic acid vinyl ester such as vinyl acetate, vinyl benzoate, and the like; a C1-C20 unsaturated carboxylic acid glycidyl ester such as glycidyl (meth)acrylate and the like; a vinyl cyanide compound such as (meth) acrylonitrile and the like; an unsaturated amide compound such as (meth)acrylamide and the like; a monofunctional or a polyfunctional (meth)acrylate of a monoalcohol or a polyhydric alcohol such as ethylene glycol di(meth)acrylate, triethylene glycol di(meth)acrylate, trimethylolpropane tri(meth)acrylate, 1,4-butanediol di(meth)acrylate, 1,6-hexanediol di(meth)acrylate, octyldiol di(meth)acrylate, nonyldiol di(meth)acrylate, decanediol di(meth)acrylate, undecanediol di(meth)acrylate, dodecyldiol di(meth)acrylate, neopentylglycol di(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra(meth)acrylate, dipentaerythritol penta(meth)acrylate, dipentaerythritol hexa(meth)acrylate, bisphenol A di(meth)acrylate, novolac epoxy (meth)acrylate, diethyleneglycol di(meth)acrylate, tri(propylene glycol) di(meth)acrylate, poly(propylene glycol) di(meth)acrylate, and the like, without being limited thereto.

In an embodiment, the photocurable monomer may include one or more of a mono(meth)acrylate having a C1-C20 alkyl group, a di(meth)acrylate of a C2-C20 diol, a tri(meth)acrylate of a C3-C20 triol, or a tetra(meth)acrylate of a C4-C20 tetraol.

The photocurable monomer may be present in an amount of about 1 to about 99 parts by weight based on 100 parts by weight of (A)+(B) in terms of solid content. In an implementation, the photocurable monomer may be present in an amount of about 20 to about 95 parts by weight, e.g., about 30 to about 95 parts by weight, or about 30 to about 65 parts by weight. Within this range, the photocurable composition may exhibit strong resistance to plasma, thereby lowering or preventing outgas generation from plasma or reducing water vapor transmission rate in manufacture of thin encapsulation layers.

(B) Silicon-Containing Monomer or Oligomer Thereof

The silicon-containing monomer or oligomer thereof may be a silicon type photocurable monomer or oligomer thereof. The silicon-containing monomer or oligomer thereof may contain silicon (Si) and photocurable functional groups at ends thereof, e.g., two ends thereof. The photocurable functional groups may include, e.g., substituted or unsubstituted vinyl groups, acrylate groups, or methacrylate groups.

The monomer or oligomer thereof may include a dual-end curable monomer or oligomer thereof.

In an embodiment, the silicon-containing monomer may be represented by Formula 1:

[Formula 1]

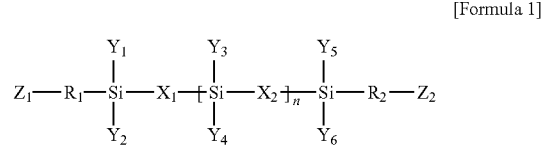

In Formula 1, $X_1$ and $X_2$ may be the same or different and may be O, S, N—H, or N—R'; R' may be a substituted or unsubstituted C1-C20 alkyl group; $R_1$ and $R_2$ may be the same or different and may be a single bond, a substituted or unsubstituted C1-C20 alkylene group, a substituted or unsubstituted C1-C30 alkyl ether group, a substituted or unsubstituted C1-C30 alkylamine group, a substituted or unsubstituted C1-C30 alkyl sulfide group, a substituted or unsubstituted C6-C30 arylene group, a substituted or unsubstituted C7-C30 arylalkylene group, or a substituted or unsubstituted C1-C20 alkoxylene group; and $Y_1$, $Y_2$, $Y_3$, $Y_4$, $Y_5$, and $Y_6$ may be the same or different and may be hydrogen, a substituted or unsubstituted C1-C30 alkyl group, a substituted or unsubstituted C1-C30 alkyl ether group, a substituted or unsubstituted C1-C30 dialkylamine group, a substituted or unsubstituted C1-C30 alkyl sulfide group, a substituted or unsubstituted C6-C30 aryl group, a substituted or unsubstituted C7-C30 aryl alkyl group, a substituted or unsubstituted C1-C30 alkylene group, a substituted or unsubstituted C1-C30 alkoxylene group, or a compound represented by Formula 2 or 3:

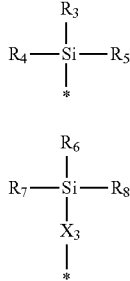

[Formula 2]

[Formula 3]

wherein * represents a binding site for Si in Formula 1; $R_3$, $R_4$, $R_5$, $R_6$, $R_7$, and $R_8$ may be the same or different and may be hydrogen, a substituted or unsubstituted C1-C30 alkyl group, a substituted or unsubstituted C1-C30 alkyl ether group, a substituted or unsubstituted C1-C30 dialkylamine group, a substituted or unsubstituted C1-C30 alkyl sulfide group, a substituted or unsubstituted C6-C30 aryl group, or a substituted or unsubstituted C7-C30 aryl alkyl group; $X_3$ may be O, S, N—H, or N—R'; R' may be a substituted or unsubstituted C1-C20 alkyl group; and $Z_1$ and $Z_2$ may be the same or different and may be a compound represented by Formula 4:

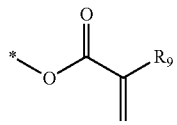

[Formula 4]

wherein * represents a binding site for $R_1$ or $R_2$ in Formula 1, $R_9$ may be hydrogen, or a substituted or unsubstituted C1-C30 alkyl group; and n may be an integer from 0 to about 30 or an average value of n may range from about 0 to about 30. Within this range, the water vapor transmission rate and outgas generation amount after curing of the composition may be lowered and the photocuring rate can be increased. In an implementation, n may be 0 to about 15, e.g., 0 to about 10.

$R_1$ and $R_2$ may be a C1-C10 alkylene group, e.g., a C1-C6 alkylene group.

$Y_1$, $Y_2$, $Y_3$, $Y_4$, $Y_5$, and $Y_6$ may be a C1-C10 alkyl group, a C6-C14 aryl group, or a compound represented by Formula 2 or 3 wherein $R_3$, $R_4$, $R_5$, $R_6$, $R_7$, and $R_8$ are a C1-C10 alkyl group. For example, $Y_1$, $Y_2$, $Y_3$, $Y_4$, $Y_5$, and $Y_6$ may be a C1-C6 alkyl group, or a compound represented by Formula 2 or 3 wherein $R_3$, $R_4$, $R_5$, $R_6$, $R_7$, and $R_8$ are a C1-C6 alkyl group.

$Z_1$ and $Z_2$ may be a compound represented by Formula 4 wherein $R_9$ is hydrogen or a C1-05 alkyl group.

In an embodiment, the silicon-containing monomer may include one or more of 1,3-bis(3-(meth)acryloxypropyl)tetramethyldisiloxane, 1,3-bis(3-(meth)acryloxypropyl) tetrakis(trimethylsiloxy)disiloxane, or a monomer of Formula 5:

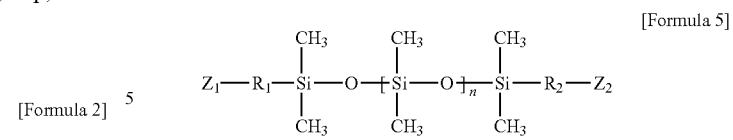

[Formula 5]

wherein $Z_1$, $Z_2$, $R_1$, $R_2$ and n are as defined in Formula 1.

The silicon-containing monomer or oligomer thereof included in the photocurable composition together with the photocurable monomer may provide a layer, the water vapor transmission rate and the outgas generation amount of which may be significantly reduced after curing, while increasing photocuring rate.

In addition, due to the presence of silicon, the silicon-containing monomer or oligomer thereof included in the organic barrier layer may minimize device damage from plasma used for deposition of an inorganic barrier layer in an existing encapsulation structure in which an inorganic barrier layer and an organic barrier layer are alternately layered.

The silicon-containing monomer or oligomer thereof may be present in an amount of about 1 to about 99 parts by weight based on 100 parts by weight of (A)+(B) of the composition in terms of solid content. In an implementation, the silicon-containing monomer or oligomer thereof may be present in an amount of about 5 to about 80 parts by weight, e.g., about 5 to about 70 parts by weight, or about 35 to about 70 parts by weight. Within this range, the photocurable composition may exhibit strong resistance to plasma, thereby lowering or preventing outgas generation from plasma or reducing water vapor transmission rate in preparation of thin encapsulation layers.

The composition may further comprise an initiator.

(C) Initiator

As an initiator, a suitable photopolymerization initiator that performs a photocurable reaction may be used. For example, the photopolymerization initiator may include one or more of triazine, acetophenone, benzophenone, thioxanthone, benzoin, phosphorous, an oxime based initiator, etc.

Examples of the triazine initiator may include 2,4,6-trichloro-s-triazine, 2-phenyl-4,6-bis(trichloromethyl)-s-triazine, 2-(3',4'-dimethoxystyryl)-4,6-bis(trichloro methyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-biphenyl-4,6-bis(trichloromethyl)-s-triazine, bis(trichloromethyl)-6-styryl-s-triazine, 2-(naphtho-1-yl)-4,6-bis (trichloromethyl)-s-triazine, 2-(4-methoxynaphtho-1-yl)-4,6-bis(trichloromethyl)-s-triazine, 2,4-trichloromethyl (piperonyl)-6-triazine, 2,4-(trichloro methyl(4'-methoxystyryl)-6-triazine, and mixtures thereof.

Examples of the acetophenone initiators may include 2,2'-diethoxy acetophenone, 2,2'-dibutoxyacetophenone, 2-hydroxy-2-methylpropiophenone, p-t-butyl trichloroacetophenone, p-t-butyldichloroacetophenone, 4-chloroacetophenone, 2,2'-dichloro-4-phenoxyacetophenone, 2-methyl-1-(4-(methylthio)phenyl)-2-morpholino propan-1-one, 2-benzyl-2-dimethylamino-1-(4-morpholinophenyl)-butan-1-one, and mixtures thereof.

Examples of the benzophenone initiators may include benzophenone, benzoyl benzoic acid, benzoyl benzoic acid methyl, 4-phenylbenzophenone, hydroxybenzophenone, acrylated benzophenone, 4,4'-bis(dimethylamino)benzophenone, 4,4'-dichlorobenzophenone, 3,3'-dimethyl-2-methoxy benzophenone, and mixtures thereof.

Examples of the thioxanthone initiators may include thioxanthone, 2-methylthioxanthone, isopropyl thioxanthone, 2,4-diethylthioxanthone, 2,4-diisopropyl thioxanthone, 2-chlorothioxanthone, and mixtures thereof.

Examples of the benzoin initiators may include benzoin, benzoin methyl ether, benzoin ethyl ether, benzoin isopropyl ether, benzoin isobutyl ether, benzyl dimethyl ketal, and mixtures thereof.

Examples of the phosphor initiators may include bisbenzoylphenyl phosphine oxide, benzoyldiphenyl phosphine oxide, and mixtures thereof.

Examples of the oxime initiators may include 2-(o-benzoyloxime)-1-[4-(phenylthio)phenyl]-1,2-octanedione, 1-(o-acetyloxime)-1-[9-ethyl-6-(2-methylbenzoyl)-9H-carbazole-3-yl]ethanone, and mixtures thereof.

The initiator may be present in an amount of about 0.1 to about 20 parts by weight based on 100 parts by weight of (A)+(B) in the photocurable composition in terms of solid content. Within this range, photopolymerization may be sufficiently exhibited under exposure to light, and reduction in transmission owing to unreacted initiator remaining after photopolymerization may be reduced or prevented. In an implementation, the initiator may be present in an amount of about 0.5 to about 10 parts by weight, e.g., about 1 to about 8 parts by weight.

The photocurable composition may be produced by mixing the photocurable monomer, the silicon-containing monomer or oligomer thereof, or further the initiator. In an implementation, the composition may be produced as a solvent-free composition that does not use a solvent.

The photocurable composition may exhibit a photocuring rate of about 90% or more. Within this range, after the photocurable composition is cured, curing shrinkage stress may be low, thereby forming layers not generating any shift, enabling use in a sealing application. In an implementation, the photocuring rate may be about 90 to about 99%, e.g., about 92 to about 98.5%.

A member (e.g., a member such as an organic light emitting diode (OLED), an illumination device, a flexible organic light emitting diode display, a metal sensor pad, a microdisc laser, an electrochromic device, a photochromic device, a microelectromechanical system, a solar cell, an integrated circuit, a charge coupled device, a light emitting polymer, a light emitting diode, etc.) for an apparatus (e.g., an apparatus such as a display apparatus) may suffer degradation or deterioration in quality from exposure to gas or liquid in a surrounding environment (e.g., oxygen and/or moisture and/or vapor in an ambient atmosphere) or from permeation of chemical materials used to process electronic products. Thus, the member for the apparatus may be sealed or encapsulated.

In an implementation, the photocurable composition may be used for forming organic barrier layers to be used in sealing or encapsulation for flexible display apparatuses.

Another embodiment relates to a barrier layer. The barrier layer may be an organic barrier layer having an outgas generation amount of about 2000 ppm or less. Within this range, the barrier layer may be applied to the member for the apparatus and help ensure a long lifespan of the member for the apparatus. In an implementation, the outgas generation amount may be about 10 ppm to about 2000 ppm, e.g., about 10 ppm to about 1720 ppm.

Another embodiment relates to an organic barrier layer having a water vapor transmission rate of about 4.0 g/m$^2$·24 hr or less, as measured at 37.8° C. and 100% RH for 24 hours at a layer thickness of 5 μm. Within this range, the barrier layer can be used to seal the members for an apparatus. In an implementation, the water vapor transmission rate may be about 1.0 to about 4.0 g/m$^2$·24 hr, e.g., about 1.9 to about 3.5 g/m$^2$·24 hr.

The barrier layer may include a cured product of the photocurable composition.

In an embodiment, the barrier layer may be formed by photocuring the photocurable composition. The photocurable composition may be coated to a thickness of about 0.1 μm to 20 μm, e.g., about 1 μm to 10 μm, and then cured by irradiating light at, e.g., about 10 mW/cm$^2$ to about 500 mW/cm$^2$ for about 1 second to about 50 seconds.

The barrier layer may have the aforementioned water vapor transmission rate and the outgas generation amount, thereby forming a barrier stack together with the inorganic barrier layer, which may be used for encapsulation of the member for an apparatus.

Another embodiment relates to a barrier stack including the organic barrier layer and the inorganic barrier layer.

The inorganic barrier layer may differ from the organic barrier layer, and may enhance the effects of the organic barrier layer.

The inorganic barrier layer may be a barrier layer that exhibits good light transmittance, and good moisture and/or oxygen barrier properties.

For example, the inorganic barrier layer may be include one or more of a metal, an intermetallic compound or alloy, an oxide of metal or mixed metals, a fluoride of a metal or mixed metals, a nitride of a metal or mixed metals, a metal carbide, an oxygen nitride of a metal or mixed metals, a boride of a metal or mixed metals, an oxygen boride of a metal or mixed metals, a silicide of a metal or mixed metals, etc. The metals may include one or more of silicon (Si), aluminum (Al), selenium (Se), zinc (Zn), antimony (Sb), indium (In), germanium (Ge), tin (Sn), bismuth (Bi), a transition metal, a lanthanide metal, etc. In an implementation, the inorganic barrier layer may include one or more of silicon oxide, silicon nitride, silicon oxygen nitride, ZnSe, ZnO, $Sb_2O_3$, $Al_2O_3$, $In_2O_3$, or $SnO_2$.

The organic barrier layer may be as described above. When the organic barrier layer is deposited alternately with the inorganic barrier layer, it may be possible to secure smoothing properties of the organic barrier layer. In addition, the organic barrier layer may be capable of preventing a defect of one inorganic barrier layer from spreading to other inorganic barrier layers.

The organic barrier layer may include a cured product of the photocurable composition according to an embodiment.

The barrier stack may include the organic barrier layer and the inorganic barrier layer. The number of barrier stacks may be determined based on, e.g., the member and/or apparatus to which the barrier stacks are applied. The combination of the barrier stacks may be modified depending on the desired degree of resistance to permeation to oxygen and/or moisture and/or steam vapor and/or chemical materials.

In the barrier stack, the organic barrier layer and the inorganic barrier layer may be alternately deposited. Such deposition may provide a favorable effect on the organic barrier layer due to physical properties of the composition. Thus, the organic barrier layer and inorganic barrier layer may supplement or reinforce the encapsulation effect on the apparatus.

The organic barrier layer and the inorganic barrier layer may be alternately deposited. In some embodiments, about 10 or less layers in total may be alternately deposited, e.g., about 2 to about 10, or 7 or less layers, or about 2 to 7 layers of the organic barrier layer and the inorganic barrier layer in total may be alternately deposited.

In the barrier stack, the organic barrier layer may have a thickness of about 0.1 µm to about 20 µm, e.g., about 1 µm to about 10 µm. The inorganic barrier layer may have a thickness of about 5 nm to about 500 nm, e.g., about 5 nm to about 50 nm.

The barrier stack may be a thin layer encapsulator for a member for the apparatus and may have a thickness of about 5 µm or less, e.g., about 1.5 µm to about 5 µm.

The inorganic barrier layer may be deposited by vacuum processes, for example, by sputtering, chemical vapor deposition, plasma chemical vapor deposition, evaporation, sublimation, electrocyclone resonance-plasma vapor deposition, or combinations thereof.

The organic barrier layer may be deposited by a method similar to that of inorganic barrier layer, or may be formed by coating and curing the photocurable composition.

Another embodiment relates to an encapsulated apparatus. The apparatus may include a member and a barrier stack formed on the member, the barrier stack including an inorganic barrier layer and an organic barrier layer according to an embodiment.

In an embodiment, the organic barrier layer may have a water vapor transmission rate of about 4.0 g/m$^2$·24 hr or less, as measured at 37.8° C. and 100% relative humidity for 24 hours at a layer thickness of 5 µm.

In another embodiment, the organic barrier layer may have an outgas generation amount of about 2000 ppm or less.

The organic barrier layer may include a cured product of the photocurable composition according to an embodiment.

The organic barrier layer may refer to an encapsulating layer for protecting the member for the apparatus including organic light emitting diodes, organic solar cells, and the like. The organic barrier layer may substantially prevent the member for the apparatus from suffering degradation or oxidization by external environment, such as moisture, oxygen, and the like. In addition, the organic barrier layer may exhibit little or no generation of outgas under high humidity conditions or high temperature and high humidity conditions, thereby minimizing outgassing of the member for the apparatus, which in turn may help prevent a reduction in performance and shortening of lifespan of the member for the apparatus.

The organic barrier layer may be formed at upper or lower portion of the inorganic barrier layer.

The inorganic barrier layer may refer to a sealing layer for protecting the member for the apparatus including an organic light emitting diode, organic solar cells, and the like. The inorganic barrier layer may be sealed by bringing the inorganic barrier layer into contact with the member for the apparatus, or by sealing an interior space in which the member for the apparatus is placed without contact with the member for the apparatus. The inorganic barrier layer may block the apparatus from contacting external oxygen or moisture, thereby helping to prevent degradation or damage of the member for the apparatus.

The inorganic barrier layer may be formed at an upper portion of the member for the apparatus, or on the upper or lower portion of the organic barrier layer.

The encapsulated apparatus may have a structure in which devices are sealed with the inorganic barrier layer and the organic barrier layer, which have different properties. At least one of the inorganic barrier layer and organic barrier layer may be coupled to a substrate for sealing the member for the apparatus.

The inorganic barrier layer and the organic barrier layer may be included in plural pairs, for example, in two pairs or more, in the apparatus. In an embodiment, the inorganic barrier layers and the organic barrier layers are deposited alternately such as in the order of inorganic barrier layer/ organic barrier layer/inorganic barrier layer/organic barrier layer. In an implementation, inorganic barrier layer/organic barrier layer pairs may be deposited a total of 10 times or less, e.g., about 2 to 10 times, or 7 times or less, or about 2 to 7 times.

Details of the organic barrier layer and the inorganic barrier layer have been set forth above.

Depending on the kind of the member for the apparatus, a substrate may be included. The substrate may be a suitable substrate that allows the member for the apparatus to be stacked thereon. Examples of the substrate may include transparent glass, plastic sheets, silicone or metal substrates, and the like.

FIG. 1 illustrates a sectional view of an encapsulated apparatus according to an embodiment.

Referring to FIG. 1, an encapsulated apparatus 100 may include a substrate 10, a member 20 for the apparatus on the substrate 10, and a barrier stack 30 formed on the member 20 for the apparatus and including an inorganic barrier layer 31 and an organic barrier layer 32, wherein the inorganic barrier layer 31 contacts the member 20 for the apparatus 20.

Figure 2:
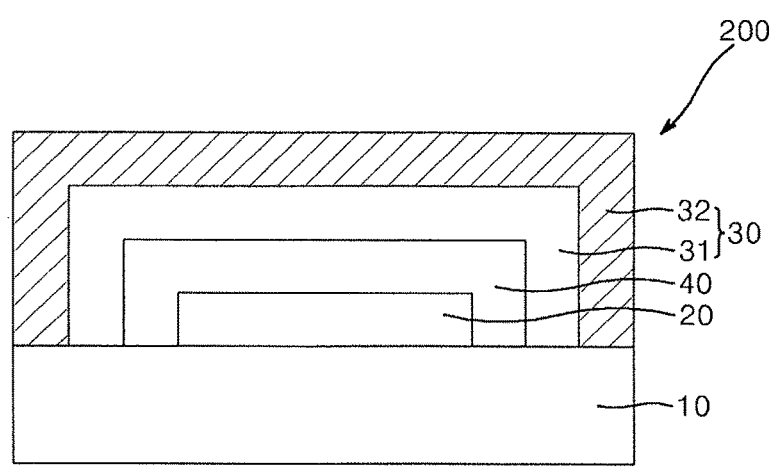
FIG. 2 is a sectional view of an encapsulated apparatus according to another embodiment.

FIG. 2 illustrates a sectional view of an encapsulated apparatus according to another embodiment.

Referring to FIG. 2, an encapsulated apparatus 200 includes a substrate 10, a member 20 for the apparatus formed on the substrate 10, and a barrier stack 32 formed on the member 20 for the apparatus and including an inorganic barrier layer 31 and an organic barrier layer 32, wherein the inorganic barrier layer 31 may seal an inner space 40 in which the member for the apparatus is received.

FIGS. 1 and 2 illustrate structures in which a single inorganic barrier layer and a single organic barrier layer are formed. However, the inorganic barrier layer and the organic barrier layer may be deposited multiple times. In addition, a sealant and/or a substrate (not shown in FIGS. 1 and 2) may be further formed on a lateral side and/or an upper portion of a composite barrier layer that includes the inorganic barrier layer and organic barrier layer.

The apparatus may be produced by a suitable method. For example, devices may be placed on a substrate and then an inorganic barrier layer may be formed thereon. The photocurable composition may be coated to a thickness of about 1 µm to about 5 µm by spin coating, slit coating, and the like, and light may be irradiated thereto to form an organic barrier layer. The procedure of forming the inorganic barrier layer and the organic barrier layer may be repeated, e.g., about 10 times or less.

In an embodiment, examples of the encapsulated apparatus may include an organic light emitting display including an organic light emitting diode, a liquid crystal display, a solar cell, etc.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.-

Details of components used in Examples and Comparative Examples are as follows:

(A) Photocurable monomer: (A1) Hexyl acrylate, (A2) Hexanediol diacrylate, (A3) Pentaerythritol tetraacrylate, (A4) Tri(propyleneglycol) diacrylate (Aldrich)

(B) Silicon-containing monomer: (B1) 1,3-bis(3-methacryloxypropyl)tetramethyl disiloxane, (B2)1,3-bis(3-methacryloxypropyl)tetrakis(trimethylsiloxy)disiloxane (Gelest), (B3) X-22-164A (Shinetsu) (monomer represented by Formula 5, wherein $R_1$ and $R_2$ are propylene group ($-CH_2CH_2CH_2-$), $Z_1$ and $Z_2$ are methacrylate groups, and an average value of n is 6):

[Formula 5]

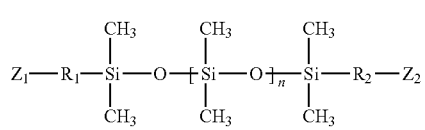

(C) Initiator: Darocur TPO (BASF AG)

EXAMPLES AND COMPARATIVE EXAMPLES

The (A) photocurable monomer, (B) silicon-containing monomer and (C) initiator were placed in amounts as listed in Table 2 (unit: parts by weight) to a 125 ml brown polypropylene bottle, followed by blending using a shaker for 3 hours to prepare compositions.

Experimental Examples

The compositions produced in Examples and Comparative Examples were evaluated as to physical properties. Results are shown in Table 2.

Evaluation of Physical Properties

1. Water vapor transmission rate: A water vapor transmission rate tester (PERMATRAN-W 3/33, manufactured by MOCON) was employed. The photocurable composition was spray-coated to an Al sample holder and subjected to UV curing by UV irradiation at 100 mW/cm² for 10 seconds to produce a cured specimen having a 5 μm thick layer. A water vapor transmission rate was measured using the water vapor transmission rate tester (PERMATRAN-W 3/33, manufactured by MOCON) at 37.8° C. and 100% RH for 24 hours at a layer thickness of 5 μm.

2. Outgas generation amount of organic barrier layer: The photocurable composition was spray-coated to a glass substrate and the subjected to UV curing by UV irradiation at 100 mW/cm² for 10 seconds to produce an organic barrier layer specimen having a size of 20 cm×20 cm×3 μm (width×length×thickness). A GC/MS tester (Perkin Elmer Clarus 600) was used to measure outgas generation. GC/MS utilized a DB-5MS column (length: 30 m, diameter: 0.25 mm, thickness of fixed phase: 0.25 μm) as a column, and helium gas (flow rate: 1.0 mL/min, average velocity=32 cm/s) as a mobile phase. Further, the split ratio was 20:1 and the temperature condition was set such that temperature was maintained at 40° C. for 3 minutes, warmed at a rate of 10° C./minute, and then maintained at 320° C. for 6 minutes. Outgas was collected under a glass size of 20 cm×20 cm, the collection container was a Tedlar bag, the collection temperature was 90° C., the collection time was 30 minutes, $N_2$ purging was conducted at a flow rate of 300 mL/minute and the adsorbent was Tenax GR (5% phenylmethyl polysiloxane). A calibration curve was plotted using a toluene solution in n-hexane in a concentration of 150 ppm, 400 ppm, and 800 ppm as a standard solution, wherein R2 value was obtained as 0.9987. The conditions are summarized in Table 1.

TABLE 1

| Conditions | Details |
|---|---|
| Collection conditions | Glass size: 20 cm × 20 cm<br>Collection container: Tedlar bag<br>Collection temperature: 90° C.<br>Collection time: 30 min<br>$N_2$ purge flow rate: 300 mL/min<br>Adsorbent: Tenax GR (5% phenylmethyl polysiloxane) |
| Conditions for plotting calibration curve | Standard solution: Toluene in n-Hexane<br>Concentration range (reference): 150 ppm, 400 ppm, 800 ppm<br>R2: 0.9987 |
| GC/MS conditions | Column: DB-5MS→30 m × 0.25 mm × 0.25 μm (5% phenylmethyl polysiloxane) |
| | Mobile phase: He |
| | Flow: 1.0 mL/min (Average velocity = 32 cm/s) |
| | Split: Split ratio = 20:1 |
| | Method: 40° C. (3 min)-10° C./min→ 320° C. (6 min) |

3. Photocuring rate: The intensity of absorption peaks for the photocurable composition was measured using FT-IR (NICOLET 4700, Thermo) near at 1635 cm⁻¹ (C=C) and 1720 cm⁻¹ (C=O). First, the photocurable composition was spray-coated on a glass substrate and then subjected to UV curing by UV irradiation at 100 mW/cm² for 10 seconds to produce a specimen having a size of 20 cm×20 cm×3 μm (width×length×thickness). The cured film was cut into specimens, which in turn were used to measure intensity of absorption peaks at near 1635 cm⁻¹ (C=C) and 1720 cm⁻¹ (C=O) using FT-IR (NICOLET 4700, by Thermo). The photocuring rate was calculated by Equation 1:

Photocuring rate (%)=|1−(A/B)×100, [Equation 1]

wherein A is a ratio of intensity of absorption peak near at 1635 cm⁻¹ to intensity of absorption peak near at 1720 cm⁻¹ on the cured film, and B is a ratio of intensity of absorption peak near at 1635 cm⁻¹ to intensity of absorption peak near at 1720 cm⁻¹ on the photocurable composition.

TABLE 2

| | | Example | | | | | | | | | Comparative Example | | |
|---|---|---|---|---|---|---|---|---|---|---|---|---|---|
| | | 1 | 2 | 3 | 4 | 5 | 6 | 7 | 8 | 9 | 1 | 2 | 3 |
| A) | (A1) | 20 | 20 | 20 | 20 | 20 | 20 | 20 | 20 | 20 | 20 | 20 | 20 |
| | (A2) | — | — | — | 35 | 65 | 35 | 65 | 35 | 50 | 70 | 35 | — |
| | (A3) | 10 | 10 | 10 | 10 | 10 | 10 | 10 | 10 | 10 | 10 | 10 | 70 |
| | (A4) | — | — | — | — | — | — | — | — | — | — | 35 | 10 |

TABLE 2-continued

|   |   | Example | | | | | | | | | Comparative Example | | |
|---|---|---|---|---|---|---|---|---|---|---|---|---|---|
|   |   | 1 | 2 | 3 | 4 | 5 | 6 | 7 | 8 | 9 | 1 | 2 | 3 |
| B) | (B1) | 70 | — | 35 | 35 | 5 | — | — | — | — | — | — | — |
|    | (B2) | — | 70 | 35 | — | — | 35 | 5 | — | — | — | — | — |
|    | (B3) | — | — | — | — | — | — | — | 35 | 20 | — | — | — |
| C) |      | 6 | 6 | 6 | 6 | 6 | 6 | 6 | 6 | 6 | 6 | 6 | 6 |
| Water vapor transmission rate (g/m² · 24 hr) | | 1.9 | 2.4 | 2.2 | 2.7 | 3.5 | 3.0 | 3.5 | 2.5 | 2.7 | 6.7 | 7.2 | 7.3 |
| Outgas generation amount (ppm) | | 940 | 570 | 810 | 1460 | 1720 | 930 | 1150 | 610 | 640 | 2400 | 4150 | 7260 |
| Photocuring Rate (%) | | 98.5 | 95 | 96 | 95 | 94 | 95 | 93 | 96 | 92 | 88 | 84 | 92 |

As shown in Table 2, the layers produced from the photocurable composition according to embodiments demonstrated low water vapor transmission rate and significantly reduced outgassing, as compared to the Comparative Examples. In addition, the photocurable composition according to embodiments demonstrated a significantly high photocuring rate as compared to the Comparative Examples.

By way of summation and review, organic light emitting diodes may suffer from moisture or oxygen flowing from outside, or from outgases generated inside or outside the light emitting diodes despite sealing. Thus, organic materials and/or electrode materials may be oxidized, causing deterioration in the performance and lifespan thereof. Coating with a photocurable sealing agent, attachment of a transparent or opaque moisture absorbent, or provision of frits to a substrate on which an organic light emitting part is formed may be tried to reduce or avoid such issues.

As described above, a member for an apparatus may suffer degradation or deterioration in quality from exposure to gas or liquid in a surrounding environment or from permeation of chemical materials used to process electronic products. As described above, the member for the apparatus may be sealed or encapsulated using a photocurable composition according to embodiments.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An apparatus comprising an encapsulated member, the encapsulated member including a barrier stack on the member, the barrier stack including an inorganic barrier layer and an organic barrier layer, the organic barrier layer having an outgas generation amount of about 2000 ppm or less,
    wherein the member includes one or more of a flexible organic light emitting diode, an organic light emitting diode, a light emitting polymer, or a light emitting diode,
    wherein the outgas generation amount is measured under conditions described in Table 1 herein,
    wherein the organic barrier layer is formed by curing a photocurable composition, the photocurable composition including:
        a photocurable monomer, and
        a silicon-containing monomer or oligomer thereof,
    wherein the photocurable monomer includes one or more of a mono(meth)acrylate having a C1-C20 alkyl group, a di(meth)acrylate of a C2-C20 diol, a tri(meth)acrylate of a C3-C20 triol, or a tetra(meth)acrylate of a C4-C20 tetraol, and
    wherein the photocurable composition includes the silicon-containing monomer or oligomer thereof and the photocurable monomer in a weight ratio of 55:45 to 99:1.

2. The apparatus as claimed in claim 1, wherein the inorganic barrier layer includes one or more of a metal, a metal oxide, a metal nitride, a metal carbide, a metal oxygen nitride, a metal oxygen boride, and wherein the metal is silicon, aluminum, selenium, zinc, antimony, indium, germanium, tin, bismuth, a transition metal, or a lanthanide metal.

3. The apparatus as claimed in claim 1, wherein the organic barrier layer and the inorganic barrier layer are alternately deposited in the barrier stack.

4. The apparatus as claimed in claim 1, wherein the organic barrier layer and the inorganic barrier layer are deposited a total of 10 times or less in the barrier stack.

5. The apparatus as claimed in claim 1, wherein the organic barrier layer has a thickness of about 0.1 μm to about 20 μm and the inorganic barrier layer has a thickness of about 5 nm to about 500 nm.

6. The apparatus as claimed in claim 1, wherein
    the silicon-containing monomer is represented by Formula 1:

[Formula 1]

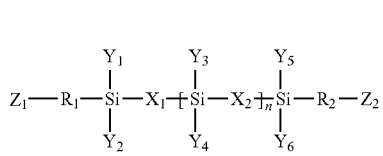

wherein, in Formula 1,
$X_1$ and $X_2$ are the same or different and are O, S, N—H, or N—R';
R' is a substituted or unsubstituted C1-C20 alkyl group;
$R_1$ and $R_2$ are the same or different and are a single bond, a substituted or unsubstituted C1-C20 alkylene group, a substituted or unsubstituted C1-C30 alkyl ether group, a substituted or unsubstituted C1-C30 alkylamine group, a substituted or unsubstituted C1-C30 alkyl sulfide group, a substituted or unsubstituted C6-C30 arylene group, a substituted or unsubstituted C7-C30 arylalkylene group, or a substituted or unsubstituted C1-C20 alkoxylene group; and $Y_1$, $Y_2$, $Y_3$, $Y_4$, $Y_5$, and $Y_6$ are the same or different and are hydrogen, a substituted or unsubstituted C1-C30 alkyl group, a substituted or unsubstituted C1-C30 alkyl ether group, a substituted or unsubstituted C1-C30 dialkylamine group, a substituted or unsubstituted C1-C30 alkyl sulfide group, a substituted or unsubstituted C6-C30 aryl group, a substituted or unsubstituted C7-C30 aryl alkyl group, a substituted or unsubstituted C1-C30 alkylene group, a substituted or unsubstituted C1-C30 alkoxylene group, or a group represented by Formula 2 or Formula 3:

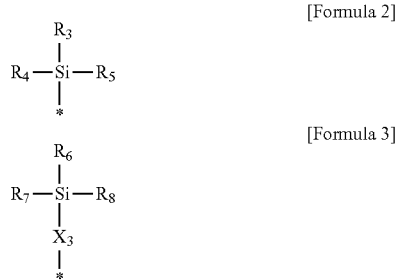

[Formula 2]

[Formula 3]

wherein, in Formula 2 and Formula 3,
* represents a binding site for Si in Formula 1;
$R_3$, $R_4$, $R_5$, $R_6$, $R_7$, and $R_8$ are the same or different and are hydrogen, a substituted or unsubstituted C1-C30 alkyl group, a substituted or unsubstituted C1-C30 alkyl ether group, a substituted or unsubstituted C1-C30 dialkylamine group, a substituted or unsubstituted C1-C30 alkyl sulfide group, a substituted or unsubstituted C6-C30 aryl group, or a substituted or unsubstituted C7-C30 aryl alkyl group;
$X_3$ is O, S, N—H, or N—R'; and
R' is a substituted or unsubstituted C1-C20 alkyl group;
wherein, in Formula 1, $Z_1$ and $Z_2$ are the same or different and are a group represented by Formula 4:

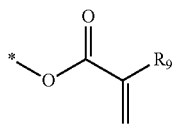

[Formula 4]

wherein, in Formula 4,
* represents a binding site for $R_1$ or $R_2$ in Formula 1,
$R_9$ is hydrogen, or a substituted or unsubstituted C1-C30 alkyl group; and
n is an integer from 0 to about 30, or an average value of n being about 30 or less.

7. The apparatus as claimed in claim 6, wherein, in Formula 1, $R_1$ and $R_2$ are both a propylene group.

8. The apparatus as claimed in claim 1, wherein the photocurable composition includes the silicon-containing monomer or oligomer thereof and the photocurable monomer in a weight ratio of 70:30 to 99:1.

9. An apparatus comprising an encapsulated member, the encapsulated member including a barrier stack on the member, the barrier stack including an inorganic barrier layer and an organic barrier layer, the organic barrier layer having a water vapor transmission rate of about 4.0 g/m$^2$·24 hr or less as measured at 37.8° C. and 100% RH for 24 hours at a layer thickness of 5 μm in a thickness direction,
wherein the organic barrier layer is formed by curing a photocurable composition, the photocurable composition including:
a photocurable monomer, and
a silicon-containing monomer or oligomer thereof,
wherein the member includes one or more of a flexible organic light emitting diode, an organic light emitting diode, an illumination device, a metal sensor pad, a microdisc laser, a photochromic device, a microelectromechanical system, a solar cell, an integrated circuit, a charge coupled device, a light emitting polymer, or a light emitting diode, and
wherein the photocurable composition includes the silicon-containing monomer or oligomer thereof and the photocurable monomer in a weight ratio of 55:45 to 99:1.

10. The apparatus as claimed in claim 9, wherein the inorganic barrier layer includes one or more of a metal, a metal oxide, a metal nitride, a metal carbide, a metal oxygen nitride, a metal oxygen boride, and wherein the metal is silicon, aluminum, selenium, zinc, antimony, indium, germanium, tin, bismuth, a transition metal, or a lanthanide metal.

11. The apparatus as claimed in claim 9, wherein the organic barrier layer and the inorganic barrier layer are alternately deposited in the barrier stack.

12. The apparatus as claimed in claim 9, wherein the organic barrier layer and the inorganic barrier layer are deposited a total of 10 times or less in the barrier stack.

13. The apparatus as claimed in claim 9, wherein the organic barrier layer has a thickness of about 0.1 μm to about 20 μm and the inorganic barrier layer has a thickness of about 5 nm to about 500 nm.

14. The apparatus as claimed in claim 9, wherein the silicon-containing monomer is represented by Formula 1:

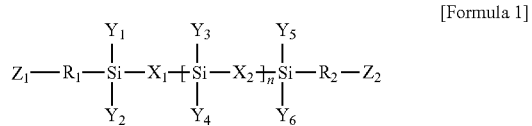

[Formula 1]

wherein, in Formula 1,
$X_1$ and $X_2$ are the same or different and are O, S, N—H, or N—R';
R' is a substituted or unsubstituted C1-C20 alkyl group;
$R_1$ and $R_2$ are the same or different and are a single bond, a substituted or unsubstituted C1-C20 alkylene group, a substituted or unsubstituted C1-C30 alkyl ether group, a substituted or unsubstituted C1-C30 alkylamine group, a substituted or unsubstituted C1-C30 alkyl sulfide group, a substituted or unsubstituted C6-C30 arylene group, a substituted or unsubstituted C7-C30 arylalkylene group, or a substituted or unsubstituted C1-C20 alkoxylene group; and $Y_1$, $Y_2$, $Y_3$, $Y_4$, $Y_5$, and $Y_6$ are the same or different and are hydrogen, a substituted or unsubstituted C1-C30 alkyl group, a substituted or unsubstituted C1-C30 alkyl ether group, a substituted or unsubstituted C1-C30 dialkylamine group, a substituted or unsubstituted C1-C30 alkyl sulfide group, a substituted or unsubstituted C6-C30 aryl group, a substituted or unsubstituted C7-C30 aryl alkyl group, a substituted or unsubstituted C1-C30 alkylene group, a substituted or unsubstituted C1-C30 alkoxylene group, or a group represented by Formula 2 or Formula 3:

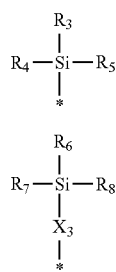

[Formula 2]

[Formula 3]

wherein, in Formula 2 and Formula 3,

* represents a binding site for Si in Formula 1;

$R_3$, $R_4$, $R_5$, $R_6$, $R_7$, and $R_8$ are the same or different and are hydrogen, a substituted or unsubstituted C1-C30 alkyl group, a substituted or unsubstituted C1-C30 alkyl ether group, a substituted or unsubstituted C1-C30 dialkylamine group, a substituted or unsubstituted C1-C30 alkyl sulfide group, a substituted or unsubstituted C6-C30 aryl group, or a substituted or unsubstituted C7-C30 aryl alkyl group;

$X_3$ is O, S, N—H, or N—R'; and

R' is a substituted or unsubstituted C1-C20 alkyl group;

wherein, in Formula 1, $Z_1$ and $Z_2$ are the same or different and are a group represented by Formula 4:

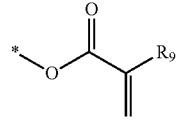

[Formula 4]

wherein, in Formula 4,

* represents a binding site for $R_1$ or $R_2$ in Formula 1, $R_9$ is hydrogen, or a substituted or unsubstituted C1-C30 alkyl group; and n is an integer from 0 to about 30, or an average value of n being about 30 or less.

15. The apparatus as claimed in claim 14, wherein, in Formula 1, $R_1$ and $R_2$ are both a propylene group.

16. The apparatus as claimed in claim 9, wherein the photocurable composition includes the silicon-containing monomer or oligomer thereof and the photocurable monomer in a weight ratio of 70:30 to 99:1.

* * * * *